United States Patent [19]
Narcisi

[11] Patent Number: 5,215,001
[45] Date of Patent: Jun. 1, 1993

[54] FAST COOK PASTA MACHINE AND PASTA COMBINATION

[76] Inventor: Henry R. Narcisi, 238 Larch Rd., Frankfort, Ill. 60423

[21] Appl. No.: 917,876

[22] Filed: Jul. 23, 1992

[51] Int. Cl.5 .............................................. A47J 37/12
[52] U.S. Cl. ...................................... 99/357; 99/330; 99/352; 99/403; 99/407
[58] Field of Search ..................................... 99/330–332, 99/339, 352, 355, 357, 359–360, 403, 404, 407, 410; 426/514, 557, 499

[56] References Cited

U.S. PATENT DOCUMENTS

| | | | |
|---|---|---|---|
| 4,138,503 | 2/1979 | Ziolko | 426/514 |
| 4,175,482 | 11/1979 | Kumagaya | 99/330 |
| 4,214,514 | 7/1980 | Contino et al. | 99/408 |
| 4,416,910 | 11/1983 | Hayashi et al. | 426/514 |
| 4,803,916 | 2/1989 | Tacconi | 99/355 |
| 4,803,917 | 2/1989 | Barbieri | 99/407 |
| 4,816,281 | 3/1989 | Moriyama et al. | 426/557 |
| 4,869,160 | 9/1989 | Pratolongo | 99/352 |
| 4,901,632 | 2/1990 | Lori | 99/403 |
| 5,010,806 | 4/1991 | Narcisi et al. | 99/357 |
| 5,033,364 | 7/1991 | Narcisi et al. | 99/331 |

FOREIGN PATENT DOCUMENTS 0171522 2/1986 European Pat. Off. .............. 99/330

OTHER PUBLICATIONS

The Encyclopedia of Food; Ward; p. 292; Jun. 1984, "Macaroni and Similar Pastes".

Primary Examiner—Timothy F. Simone
Attorney, Agent, or Firm—Ernest Kettelson

[57] ABSTRACT

A machine to fast cook individual servings of pasta and pasta for use in such machine together in combination, comprises a pressurized boiler to heat water to a temperature of about 155 degrees Celsius under pressure of about 7 atmospheres or about 105 psi, a cooking chamber to receive an individual serving of pasta for cooking and to thereafter receive the heated and pressurized water from the boiler to cook the pasta for about thirty seconds, an expansion chamber for vaporization of the heated water when discharged from the cooking chamber, a discharge assembly to discharge the individual serving of pasta when cooked, and pasta for use in such machine which comprises cylindrical tubular lengths of pasta, whose primary ingredients are finely ground wheat and water, which have a small diameter bore extending longitudinally through the center of each length of pasta. The highly pressurized heated water can flow into the central bore of each length of pasta and penetrate through the pores of the inner wall surrounding the central bore as well as through the pores of the outer cylindrical wall of each length of pasta to reach all interior portions of the pasta between the outer wall and inner wall with the heated water thereby making it possibly to thoroughly cook each length of such pasta very rapidly.

48 Claims, 8 Drawing Sheets

FAST COOK PASTA MACHINE AND PASTA COMBINATION

BACKGROUND OF THE INVENTION

This invention relates to the field of fast cooking pasta such as spaghetti in individual servings, and rapidly enough for use in vending machines, machines for use in fast food restaurants, and the like, in combination with lengths of pasta for use in such machines.

Prior art machines of this kind do not include controls and apparatus which make it possible to monitor and maintain the water temperature needed and the pressure needed to accomplish complete cooking of the spaghetti and other pasta within the short time span of about a minute or less. The machine in accordance with the present invention includes such controls and apparatus and thus solves the problem of failing to completely cook the spaghetti or other pasta. The pasta in accordance with this invention comprises cylindrical tubular lengths of pasta having a central bore extending longitudinally completely through each length.

Prior art machines for cooking foods such as spaghetti and other pasta include those disclosed in the following United States patents:

U.S. Pat. No. 5,033,364 which issued Jul. 23, 1991 on an application filed by the same inventors as in this case.

U.S. Pat. No. 4,901,632 discloses a machine which performs a three phase cooking process and utilizes a plurality of cooking chambers.

U.S. Pat. No. 4,869,160 discloses a machine for fast cooking of pasta and the like which also utilizes a plurality of cooking chambers, in this case two, and a food transfer system comprising a conduit and valve through which the pasta must be moved in order to complete the second phase of the cooking cycle.

U.S. Pat. No. 4,803,916 discloses a machine for rapidly cooking batches of spaghetti, which also utilizes two cooking chambers and requires a food transfer system comprising a valve and conduit through which the food has to be moved from the first cooking chamber to the second.

U.S. Pat. No. 4,821,632 discloses an apparatus for automatically cooking pasta comprising a basket to hold the pasta inside a housing which receives heated water, two heat exchangers and a recirculating system to conserve and re-utilize heat from previously used water to cook a previous batch of pasta.

U.S. Pat. No. 4,803,917 discloses an apparatus to automatically cook pasta and deposit it on a serving plate, comprising a basket to hold the serving of pasta to be cooked, a cooking vessel to receive boiling water which can be moved upwardly to receive the basket of pasta therein for cooking, and apparatus to thereafter move the basket of cooked pasta into position over the serving plate whereupon it opens to deposit the pasta on the plate.

U.S. Pat. No. 4,741,261 discloses a cooking apparatus for simultaneously cooking several separate quantities of pasta, including a plurality of perforated baskets to hold each quantity of pasta, and a chamber of steam and hot water in which the baskets of pasta are suspended for cooking.

U.S. Pat. No. 4,214,514 discloses a cooking device for cooking individual servings of food, comprising a plurality of perforated pots to hold individual servings of pasta or the like, into which boiling water is pumped from a reservoir to cook the pasta, after which the pots are lifted to let the water drain through the perforations and the individual servings can then be removed for eating.

U.S. Pat. No. 4,175,482 discloses an automatic high-pressure flash cooker to cook beans or grains under high pressure steam, comprising a steaming chamber in which the food product is exposed to steam, and conduits to introduce the steam therein as well as to later drain the water and steam therefrom, after which the flash-cooked beans or grains are removed.

U.S. Pat. No. 3,928,045 discloses an automatic cooking and vending machine for boiled noodles, comprising a refrigeration chamber to hold containers of pre-cooked or boiled noodles, a cooking chamber to heat the noodles and eventually add a broth thereto for flavoring, then dispensing the broth flavored noodles in the containers for eating.

U.S. Pat. No. 3,790,391 discloses an apparatus for steam pressure cooking of food, comprising a steam pressure cooker, an open top container therein to hold the food to be cooked, a steam distributing pipe having apertures for release of steam positioned below the open top containers, and steam from an external source is pumped into and through the steam distributing pipe from which steam exits through the apertures and through the food in the open top container positioned above the steam distributing pipe.

SUMMARY OF THE INVENTION

It is an object of the invention to provide a machine to fast cook pasta within about a minute or less in combination with pasta for such machine, including a first chamber to partially cook the food contents in water heated above the boiling point under pressure and a second chamber to receive the entire contents of the first to decompress and lower the water temperature to below the boiling point and to complete the cooking of the food contents in hot water but below the boiling point, and lengths of pasta having a central bore extending longitudinally therethrough.

It is an object of the invention to provide a machine to fast cook pasta within about a minute or less in two separate chambers in combination with pasta for such machine, the first chamber having water heated above 100 degrees Celsius and under pressure, the second chamber having water heated below 100 degrees Celsius and decompressed, including sensors to monitor both temperature and pressure in the first chamber, and means to increase both temperature and pressure of the water in said first chamber when needed to maintain the temperature and pressure at a constant level throughout the cooking time in said first chamber, the lengths of pasta being cylindrical and tubular having a central bore extending longitudinally therethrough.

DESCRIPTION OF PREFERRED EMBODIMENT

Figure 1:
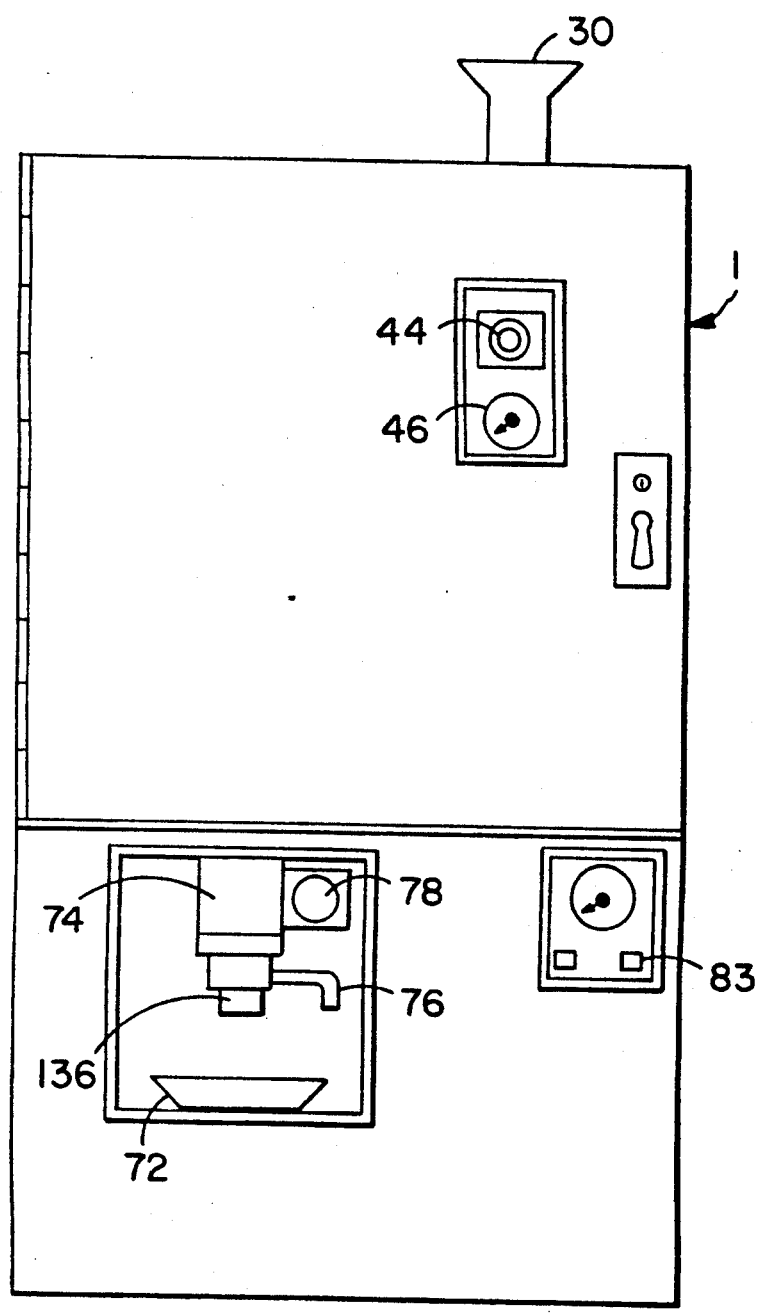
FIG. 1 is an elevation view of a machine to fast cook spaghetti and the like in accordance with this invention.
Figure 2:
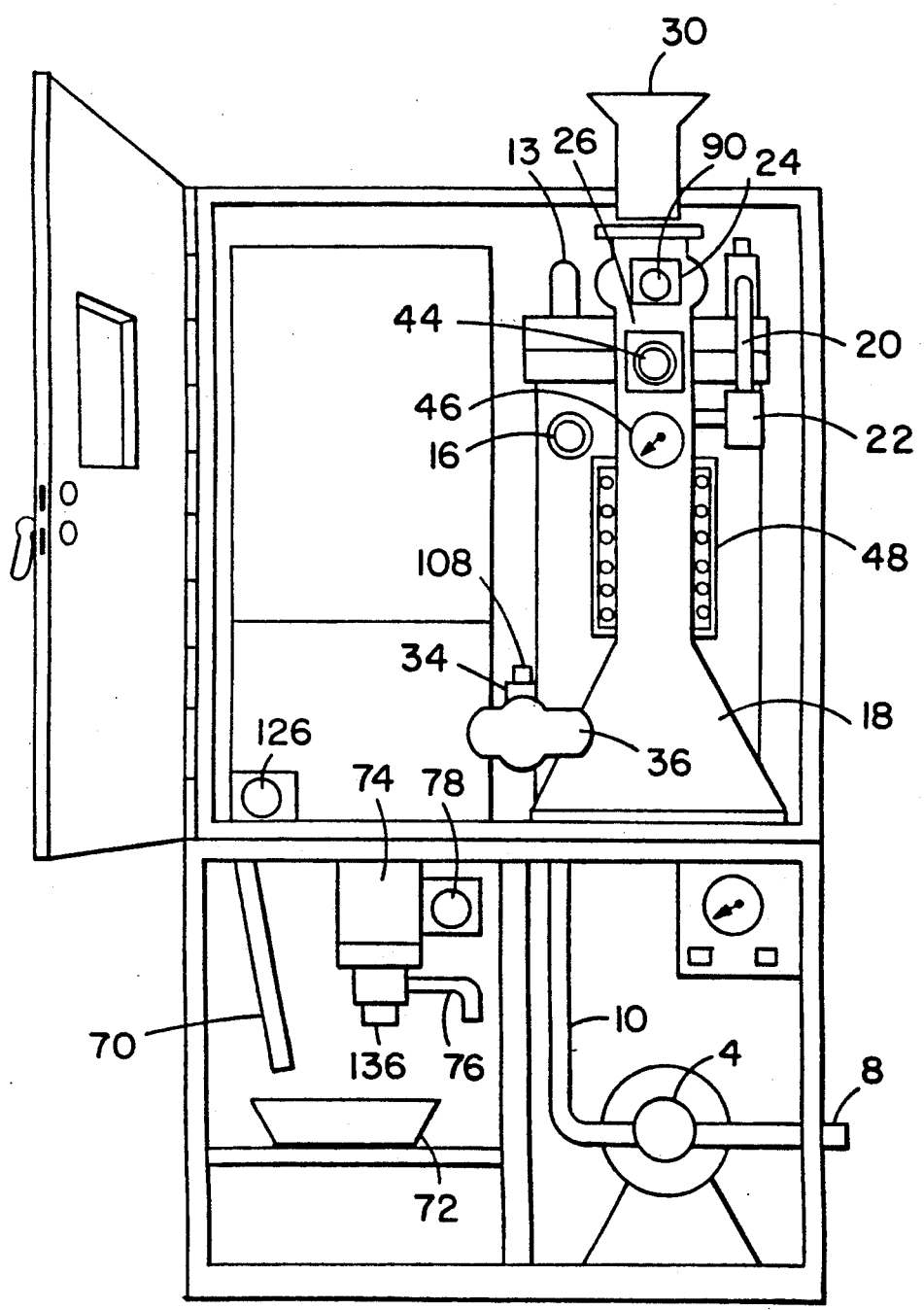
FIG. 2 is an elevation view of the machine in FIG. 1 with the hinged panel door opened, and the removable lower panels removed to show the components inside.
Figure 3:
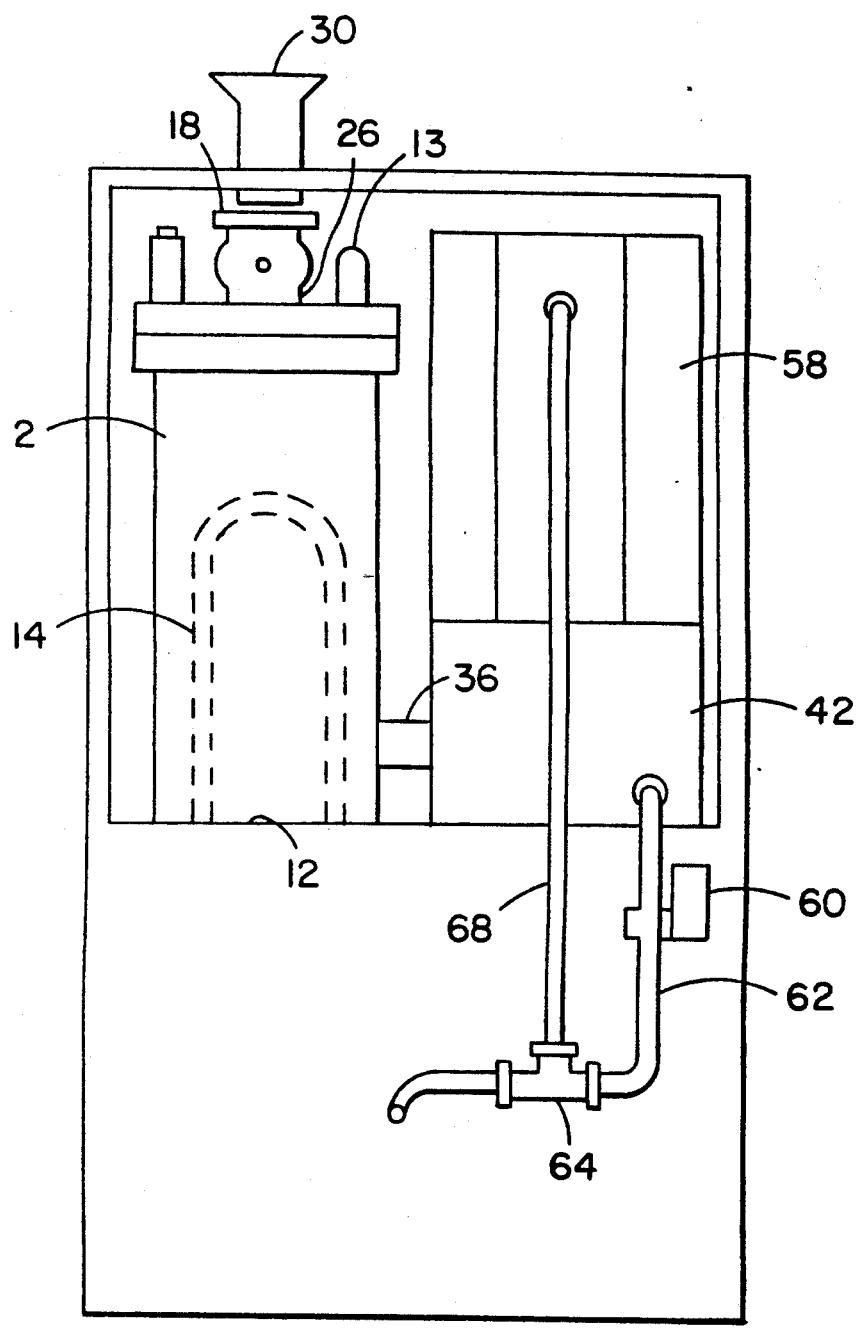
FIG. 3 is an elevation view from the rear of the machine in FIG. 1 with the back panel removed.
Figure 4:
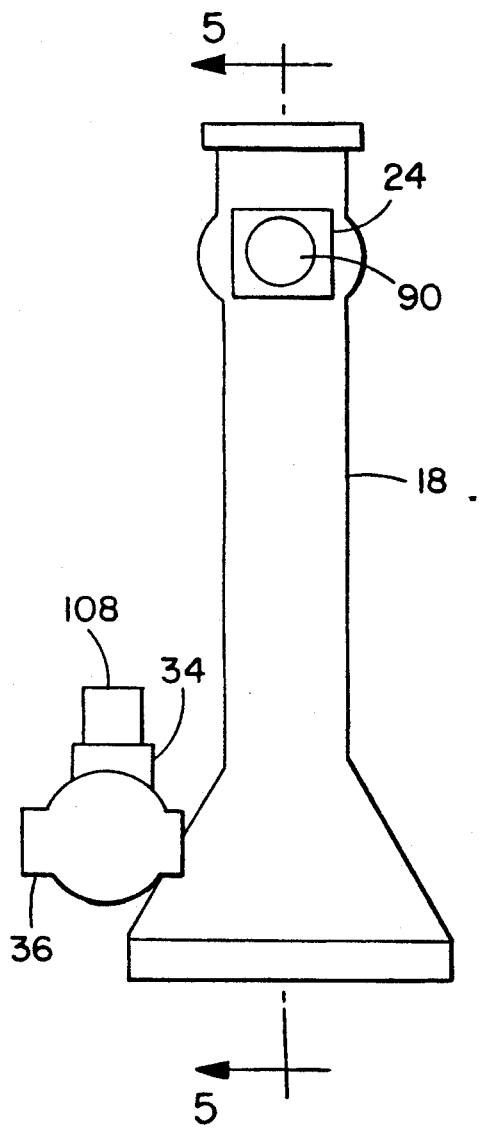
FIG. 4 is an elevation view of the first cooking chamber in accordance with this invention.
Figure 5:
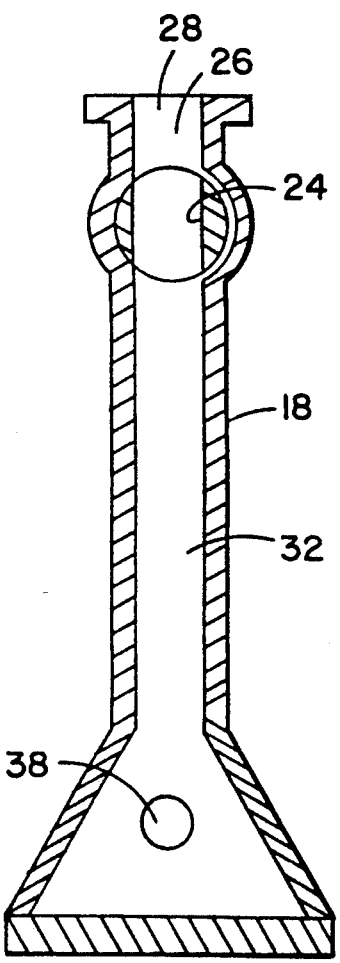
FIG. 5 is a section view taken on line 5—5 of FIG. 4.
Figure 6:
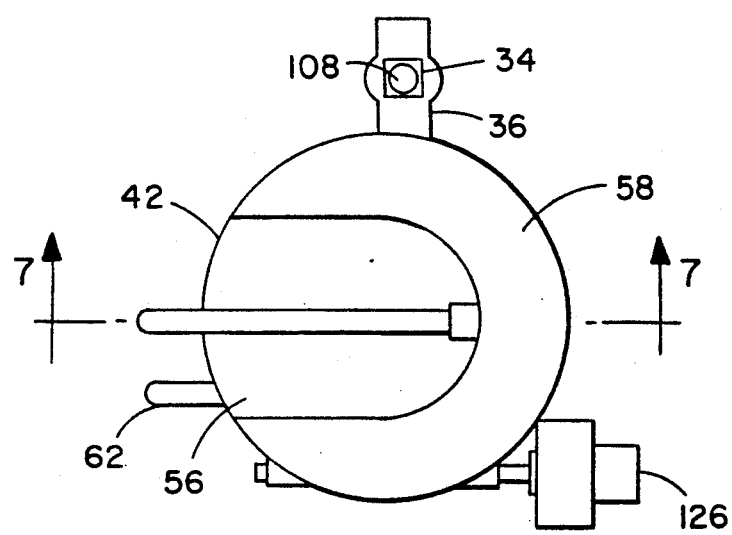
FIG. 6 is a top plan view of the expansion tank and second cooking chamber in accordance with this invention.
Figure 7:
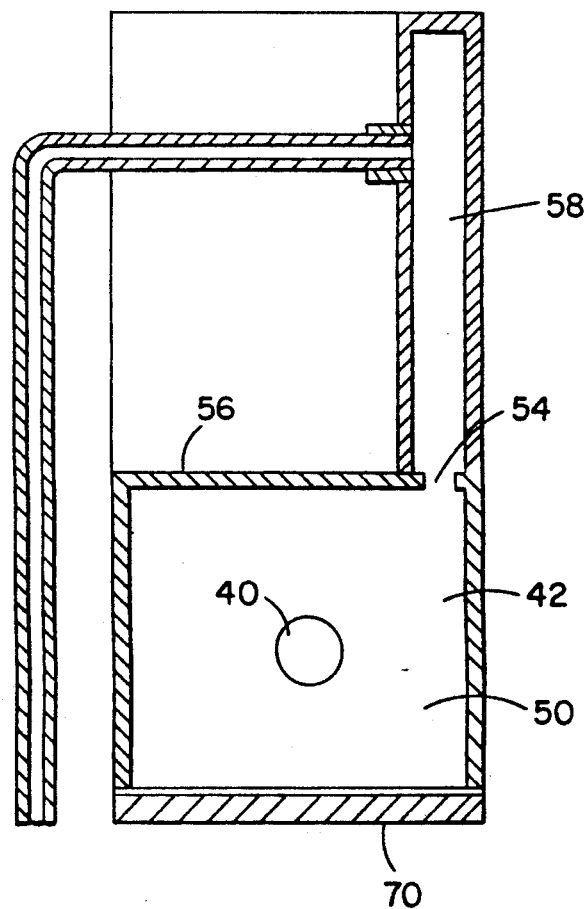
FIG. 7 is a section view taken on line 7—7 of FIG. 6.
Figure 8:
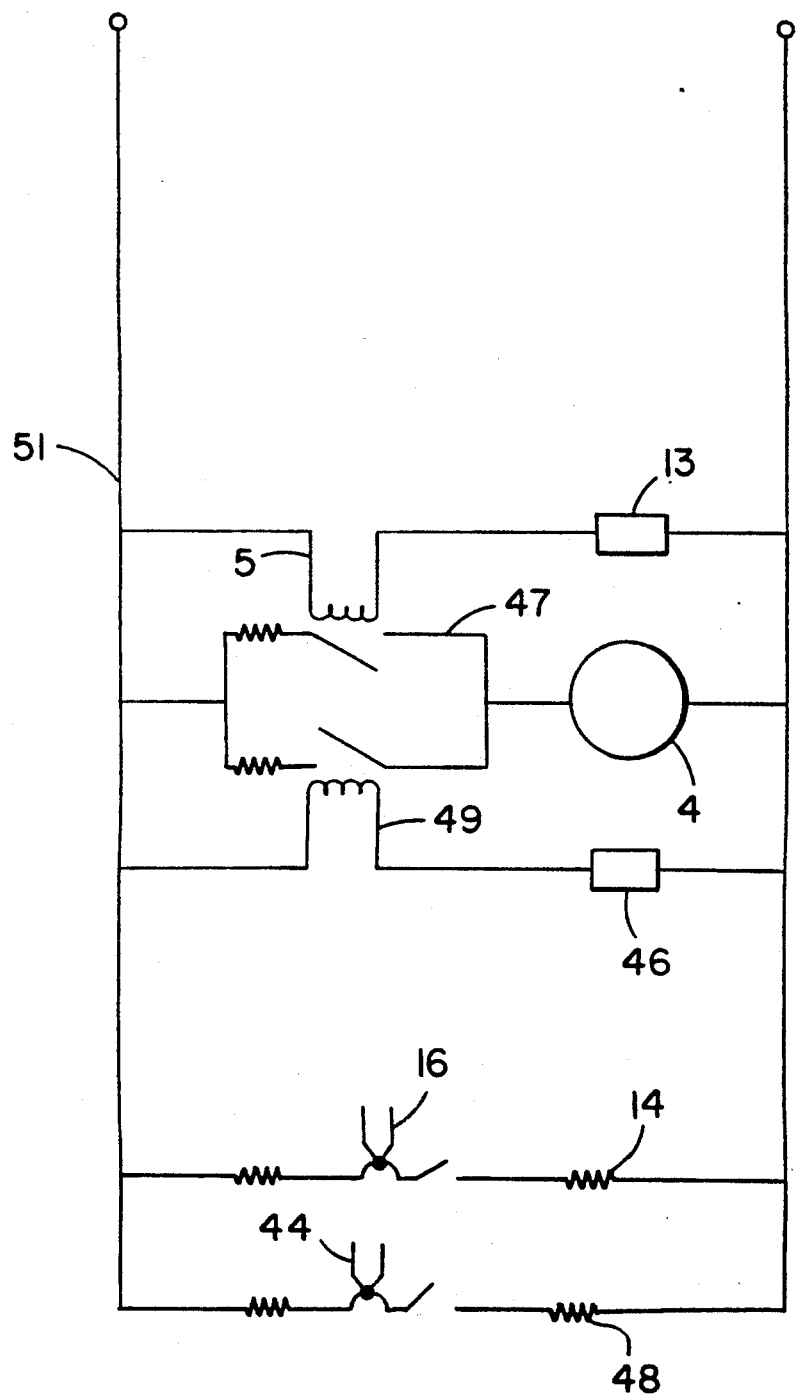
FIG. 8 is a schematic showing the operating and control circuits for the pump to supply pressurized water to the boiler and for the heating element to raise the temperature thereof to the elevated level selected.
Figure 9:
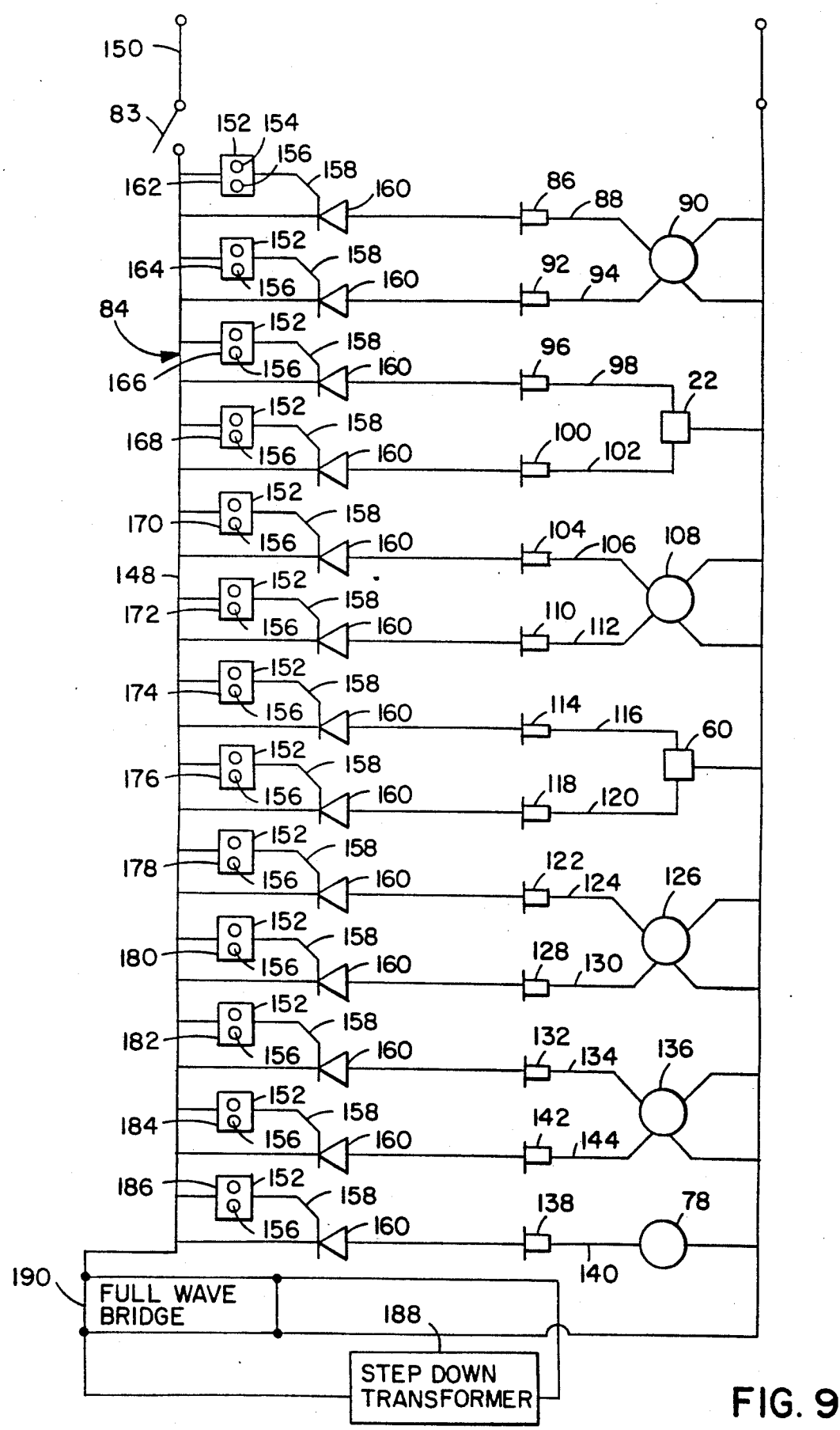
FIG. 9 is a schematic of the sequential controller in accordance with this invention to automatically control operations of the fast cook machine in the sequence and for the time durations selected for each sequence.
Figure 10:
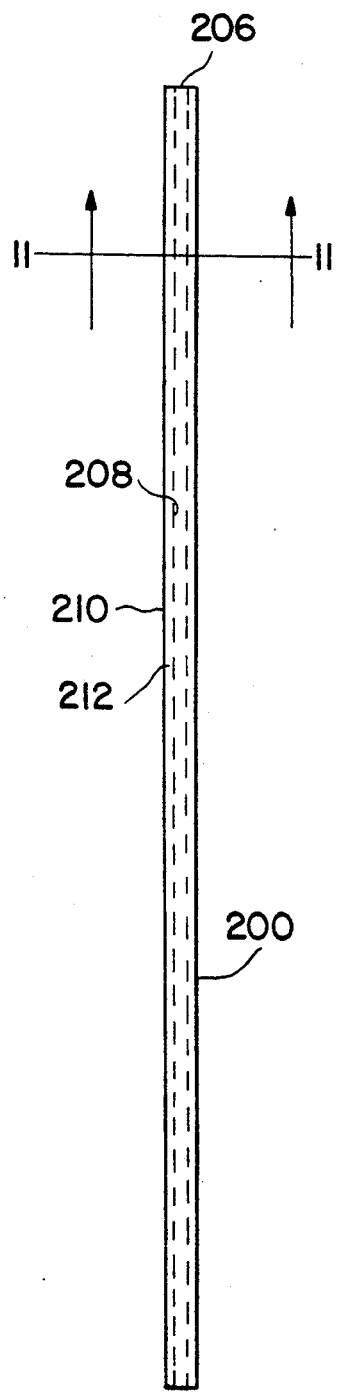
FIG. 10 is a side elevation view of a length of pasta for use in the fast cook pasta machine in accordance with this invention.
Figure 11:
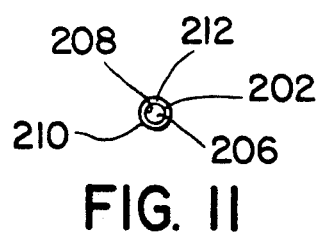
FIG. 11 is a section view taken on line 11—11 of FIG. 10.
Figure 12:
FIG. 12 is an elevation view of a die used to form a longitudinal bore through the length of pasta shown in FIG. 10.

A fast cook pasta machine 1 in accordance with this invention includes a boiler 2 in which water is heated to a temperature of about one hundred fifty five degrees Celsius under pressure of about seven atmospheres or about one hundred five pounds per square inch.

An electrically powered rotary pump 4 pumps water into the boiler 2 under pressure until the desired pressure is reached whereupon pressure control valve 6 opens to release any excess pressure within the boiler 2. The pump 4 is connected at its intake side to inlet conduit 8 leading to a cold water supply source, and at its output side to outlet conduit 10 leading to an inlet aperture in the bottom wall 12 of the boiler 2. The pump 4 is connected in an electrical circuit to a power source. An electrically controlled pressure regulating valve 13 is mounted on the top wall of the boiler and connected to relay 5 in the electrical circuit of the pump 4 to open such circuit and discontinue operation of the pump 4 when pressure within the boiler 2 has reached the preset desired level of about seven atmospheres. When pressure drops below such level, the regulating valve operates to close such electrical circuit and energize the pump 4 to increase the pressure within the boiler 2.

An electric heating element 14 is provided inside of the boiler 2 to heat the water therein to the desired temperature. A thermostat 16 is connected to sense the temperature within the boiler 2 and to open and close the circuit in which heating element 14 is connected for maintaining the preselected temperature of the water within the boiler 2.

A first cooking chamber 18 is mounted adjacent the boiler 2, and connected thereto by a pressurized hot water conduit 2 to receive pressurized heated water in the cooking chamber when electrically powered control valve 22 is moved to its valve open position. The cooking chamber 18 has a ball valve 24 mounted in its upper throat portion 26 and below its inlet aperture 28. A funnel 30 is positioned above the inlet aperture 28 to receive a quantity of spaghetti, or the like, from a dispenser and direct it through the inlet aperture 28 for entry into the cavity 32 of the cooking chamber 18 when the ball valve 24 is moved to its valve open position.

After entry of the individual serving of spaghetti into the cavity 32 of the cooking chamber 18, the ball valve 24 is moved to its valve closed position. A second ball valve 34 is provided in a transfer conduit 36 connected between the discharge aperture 38 opening to the lower wall portion of the first cooking chamber 18 and the intake aperture 40 of a second cooking chamber 42. The second ball valve 34 is also in its valve closed position when the spaghetti is introduced into the cavity 32 of cooking chamber 18.

With ball valve 24 and ball valve 34 both in their valve closed position, the control valve 22 is opened to flow the heated water under pressure from the boiler 2 into the first cooking chamber 18 to cook the spaghetti therein for a period of about thirty seconds.

In order to insure that the desired temperature and pressure are maintained within the cavity 32 of the cooking chamber 18 at the desired constant level throughout the entire cooking cycle of about thirty seconds, a thermostat 44 is connected to sense the temperature within cavity 32 and a pressure gauge 46 is connected to sense the pressure within cavity 32. An auxiliary heating element 48 is provided around the peripheral wall of the cavity 32 of the cooking chamber 18, connected to an electric power source by a circuit controlled by the thermostat 44. The auxiliary heating element 48 is energized to raise the temperature within the cavity 32 if and when the thermostat 44 senses that the temperature therein has dropped below the desired temperature of about one hundred fifty five degrees Celsius.

The pressure gauge 46 is connected in an electrical control circuit 47 to energize a relay 49 when it senses that pressure within the cavity 32 of cooking chamber 18 has dropped below the desired pressure of about seven atmospheres, such relay 49 being in turn connected to close and energize the operating electrical circuit 51 which powers the rotary pump 4. Relay 49 is connected in operating electrical circuit 51 in parallel with the switch operating mechanism of pressure regulating valve 13, whereby even though such switch operating mechanism may be in the circuit open position because the pressure regulating valve 13 of the boiler 2 hasn't sensed a sufficient drop of pressure in the boiler to close the operating circuit 51 and start the pump 4, relay 49 can move to the circuit closed position to start the pump 4 on receipt of a voltage signal from pressure gauge 46 on the cooking chamber 18 through control circuit 47. Such operation of the pump 4 increases the pressure within the boiler 2 and in turn within cavity 32 of the cooking chamber 1 since valve 22 is at such time still open in the conduit 20 leading from the boiler 2 to the first cooking chamber 18.

As soon as pressure within the cavity 32 of the cooking chamber 18 has reached the desired level of about seven atmospheres, the pressure gauge 46 on the cooking chamber 18 opens the control circuit discontinuing the voltage signal to pressure regulating valve 13 on the boiler 2 which in turn opens the operating circuit that powers the rotary pump 4 thereby causing it to stop.

After the selected time period for the first cooking cycle within the first cooking chamber 18, such as thirty seconds, the control valve 22 in the pressurized hot water conduit leading from the boiler 2 to the first cooking chamber 18 is moved to the valve closed position, and ball valve 34 in the transfer conduit 36 is moved to the valve open position. The highly pressurized water and vapor in the cavity 32 of the first cooking chamber 18 together with the spaghetti therein are then sucked through the transfer conduit 36 and open ball valve 34 into the lower pressure cavity 50 of a second cooking chamber 42.

This second cooking chamber 42 has an escape aperture 54 in its top wall 56 opening to an expansion tank 58 mounted and secured above the second cooking chamber 42. As the highly pressurized water and vapor escapes rapidly through the transfer conduit 36 when ball valve 34 is opened, some of the high temperature water vaporizes and escapes as steam through the escape aperture 54 into the expansion tank. At the same time, some of the water condenses as it enters the second cooking chamber 42 and drops in temperature to below the boiling point of one hundred degrees Celsius at normal atmospheric pressure. Such water is still hot, and at a temperature which can still cook the spaghetti which was also transferred into the second cooking chamber 42 when the ball valve 34 was opened. Such hot water and spaghetti drop to the bottom portion of the second cooking chamber where the spaghetti is cooked in such hot water below one hundred degrees Celsius temperature for an additional twenty seconds or so, as desired.

When the pre-determined time for the second cooking cycle has been completed in the second cooking chamber 42, an electrically powered drain valve 60 is opened to drain the water from the second cooking chamber 42 through the outlet conduit 62 leading from the lower portion of cooking chamber 42 to a junction 64 connected to a drain 66.

A vapor discharge conduit 68 also leads to the junction 64 from the upper portion of the expansion tank 58 for escape and discharge of the steam and water vapor therefrom into the drain.

After the water has been drained from the second cooking chamber 42, the hinged bottom wall 70 thereof is pivoted from its closed position to its open position to deposit the cooked spaghetti onto a serving plate 72.

A sauce dispenser 74 is then operated to pivot sauce discharge spout 76 into registration with the serving plate 72 and operating the dispensing pump 78 to dispense sauce on to the spaghetti. The sauce dispenser can be manually operated, or operated by an electric servo motor in an electrical circuit controlled by a timer in an electric control circuit.

Construction and operation of the pressurized boiler 2 is conventional and need not be described in great detail. Rotary pump 4 pumps water under pressure into the boiler 2 to create the desired pressure therein of about seven atmospheres or about one hundred and five pounds per square inch. The pump 4 is driven by an electric motor in an operating circuit 51 connected to the electric power lines of a public utility.

The heating element 14 is also connected in the operating electric circuit 51 which in turn is connected to the public utility power lines.

An electric control circuit 82 provides automatic timed control of the various operations and components of the pasta machine.

Operation of the fast cook pasta machine in accordance with the present invention is as follows. Before a cooking cycle begins, the control valve 22 in the line leading from the boiler 2 to the first cooking chamber 18 is closed. The ball valve 24 which controls entrance of the spaghetti into the cavity 32 of the first cooking chamber 18 is also closed, as is ball valve 34 in the transfer conduit 36 leading from the first cooking chamber 18 to the second cooking chamber 42. The hinged lid or bottom wall 70 of the second cooking chamber 42 is in its closed position. The drain valve 60 in the outlet conduit 62 to drain water from the second cooking chamber 4 is also in the valve closed position.

The pump 4 and heating element 14 are first energized to fill the boiler with water heated to the desired temperature of about one hundred fifty five degrees Celsius under a desired pressure of about seven atmospheres. When that is done, the control circuit 82 is energized to provide automatic timed operation of the machine.

A sequential controller 8 is programmed and adjusted to energize each of a series of electronic switching components which may include relays, SCRs, servo-motors, solenoid valves, and the like, in timed sequence to operate each of the various control devices.

The control circuit 82 is energized by pushing a button or other switch operator to close switch 83 which in turn energizes the sequential controller 84 to begin its sequence of operations.

Terminal 86 of sequential controller 84 is first energized to supply electric energy to control circuit 88 and a servo-motor 90 connected therein to drive said servo-motor in one direction of rotation to open the ball valve 24 operatively connected to servo-motor 90 for movement between a valve closed and valve open position. A single serving of spaghetti then drops through the funnel 30 through the open ball valve 24 and into the cavity 32 of the first cooking chamber 18.

Terminal 92 of controller 84 is next energized to supply electric energy to control circuit 94 which is also connected to servo-motor 90 to drive it in the opposite direction of rotation to close the ball valve 24.

As soon as ball valve 24 has been moved to the valve closed position, the sequential controller 84 next energizes terminal 96 to supply electric energy to control circuit 98 and electrically powered control valve 22 connected therein to move it to its valve open position. High temperature water at the desired temperature of about one hundred fifty five degrees Celsius under high pressure of about seven atmospheres then flows from the boiler 2 through conduit 20 into the cavity 32 of the first cooking chamber 18.

After a preselected time period for the first cooking cycle, such as thirty seconds, the sequential controller 84 energizes terminal 100 to supply electric energy to control circuit 102 which is also connected to electrically powered control valve 22 to move it to its valve closed position.

As soon as control valve 22 has been closed, sequential controller 84 is set to energize terminal 104 to supply electric energy to control circuit 106 and a servo-motor 108 connected therein to drive said servo-motor in on direction of rotation to open the second ball valve 34 operatively connected to servo-motor 108 for movement between a valve closed and valve open position. The entire contents of the first cooking chamber 1 comprising the highly pressurized high temperature water and partially cooked spaghetti are then sucked through the transfer conduit 36 and open ball valve 34 and into the relatively lower pressure cavity 50 of the second cooking chamber 42. The vaporized water or steam passes through aperture 54 into the expansion tank 58, while the spaghetti and that portion of the heated water which condenses drops to the bottom of the second cooking chamber 42 for a pre-selected time period of about twenty seconds to complete the second cooking cycle.

As soon as the contents of the first cooking chamber 18 have passed through the transfer conduit 36 into the second cooking chamber 42, the sequential controller 84 is timed to energize terminal 110 to supply electric energy to control circuit 112 which is also connected to servo-motor 108 to drive it in the opposite direction of rotation to close the second ball valve 34.

When the timed period for the second cooking cycle has been completed, the sequential controller 84 is timed to energize terminal 114 to supply electric energy to control circuit 116 and electrically powered drain valve 60 to move it to its valve open position. The water in the second cooking chamber 42 then drains out.

When the water has been drained from the second cooking chamber 42, the sequential controller 84 energizes terminal 118 to supply electric energy to control circuit 120 which is also connected to electrically powered drain valve 60 to move it to its valve closed position.

At the same time, the sequential controller 84 energizes terminal 122 to supply electric energy to control circuit 124 and a servo-motor 126 connected therein to drive said servo-motor in one direction of rotation to open the second cooking chamber's hinged bottom wall 70 operatively connected to the servo-motor 126 for movement between a lid closed and a lid open position. The cooked spaghetti then drops from the second cooking chamber 42 on to a serving plate 72.

The sequential controller 84 next energizes terminal 128 to supply electric energy to control circuit 130 which is also connected to servo-motor 126 to drive it in the opposite direction of rotation to move the hinged bottom wall 70 of the second cooking chamber 42 to its lid closed position.

After the cooked spaghetti has been deposited in the serving plate 7 and hinged bottom wall 70 has been moved to its lid closed position, the sequential controller 84 then energizes terminal 132 to supply electric energy to control circuit 134 and a servo-motor 136 connected therein to drive it in one direction of rotation which rotates the spout 76 of sauce dispenser 74 into registration with the spaghetti in serving plate 72, such rotatable spout 76 being operatively connected to servo-motor 136 for rotation between an out-of-registration position and an in-registration position relative to the spaghetti in the serving plate 72.

As soon as spout 76 has been rotated to its in-registration position, the sequential controller 84 next energizes terminal 138 to supply electric energy to control circuit 140 and the sauce dispensing pump 78 connected therein to pump a pre-determinable amount of sauce from the sauce dispenser 74 on to the spaghetti in serving plate 72.

After the pre-determined amount of sauce has been dispensed terminal 138 and control circuit 140 are de-energized to discontinue operation of the dispensing pump 78. At the same time, terminal 142 of sequential controller 84 is energized to supply electric energy to control circuit 144 which is also connected to the servo-motor 136 to drive it in the opposite direction of rotation which rotates the dispensing spout 76 from its in-registration position to its out-of-registration position relative to the spaghetti in serving plate 72.

The sequence of automatic operations of the fast cook pasta machine in accordance with the present invention is then completed and ready for the next cycle of operations to fast cook the next individual serving of spaghetti or the like.

The sequential controller 84 comprises a main buss 148 connected in conductor 150 of control circuit 82, and a plurality of adjustable timing switches 152 connected between the main buss 148 and respective ones of the sequential controller terminals 86, 92, 100, 104, 110, 114, 118, 122, 128, 132, 138 and 142. Each timing switch 152 includes a clock mechanism 154 to measure and indicate time in terms of seconds, and a pre-selectable signal mechanism 156 comparable to that of an ordinary alarm mechanism an alarm clock which may be set to impress a signal voltage on the gate 158 of an SCR 160, respective ones of which are connected between main buss 148 and each of the said terminals of the sequential controller 84. The signal mechanism 156 includes an automatic disconnect or cut-off to interrupt the signal voltage after a pre-selectable time delay. Thus, each terminal of the sequential controller 84 can be energized in any desired sequence, at any desired time delay relative to the terminal energized previously, and for any desired length of time, by virtue of the clock mechanism 154 and signal mechanism 156 of each timing switch 152.

A detailed description of the operation of the timing switches and the control circuits of the sequential controller 84 is as follows.

The timing switches 152 all have their clock mechanism 154 coordinated to the same time, and their signal mechanism 156 is set to energize the switch mechanism thereby moving its contacts to the contact closed position at timed intervals. When the starting switch 8 is moved to its contact closed position to begin a sequence of operations, the signal mechanism 156 of the first timing switch 162 moves its switching mechanism to the circuit closed position thereby impressing a voltage on the gate 158 of SCR 160 connected to terminal 86. Current thus flows through such SCR 160 to terminal 86, through control circuit 88 to energize servo-motor 90 causing it to rotate in the direction which moves the ball valve 24 to its valve open position. The single serving of spaghetti then drops through into the first cooking chamber 18.

The signal mechanism 156 of the first timing switch 162 is set to keep the switching mechanism thereof in the circuit closed position for whatever pre-determined time needed for the ball valve 24 to move to its valve open position, whereupon the switching mechanism returns to its normally circuit open position, discontinuing current flow to terminal 86.

The second timing switch 164 connected to terminal 92 has its signal mechanism 156 set to trigger at whatever pre-determined time delay needed for the signal mechanism 156 of the first timing switch 162 to move its switch mechanism to the circuit open position and discontinue current flow through control circuit 88.

After such pre-determined time delay, the signal mechanism 15 of the second timing switch 164 moves its switching mechanism to the circuit closed position thereby impressing a voltage on the gate 158 of SCR 160 connected to terminal 92. Current thus flows through such SCR to terminal 92, through control circuit 94 to energize servo-motor 90 causing it to rotate in the opposite direction to move ball valve 24 to its valve closed position.

The signal mechanism 156 of the second timing switch 164 is set to keep the switching mechanism thereof in the circuit closed position for whatever pre-determined time needed for the ball valve 24 to move to its valve closed position, whereupon the switching mechanism returns to its normally circuit open position discontinuing current flow to terminal 92.

The third timing switch 166 connected to terminal 96 has its signal mechanism 156 set to trigger after whatever pre-determined time delay needed for the signal mechanism 156 of the second timing switch 164 to move its switch mechanism to the circuit open position and discontinue current flow through control circuit 88 by which time the ball control valve 24 has been moved to its valve closed position.

After such pre-determined time delay, the signal mechanism 156 of the third timing switch 166 becomes energized and moves its switching mechanism to the circuit closed position to impress a voltage on the gate 158 of SCR 160 connected to terminal 96. Current thus flows to terminal 96 through the SCR, and through control circuit 98 to energize the valve opening circuit of the electric control valve 22 causing it to move to its valve open position. The high temperature water under high pressure then flows from the boiler 2 through conduit 20 to the first cooking chamber 18.

The signal mechanism 156 of the third timing switch 166 is set to keep the switching mechanism thereof in the circuit closed position for whatever pre-determined time desired for the cooking cycle in the first cooking chamber 18 to be completed, such as thirty seconds. At the completion of such thirty second or other pre-selected time delay, the signal mechanism 156 and timing switch 166 becomes non-conductive whereupon its switching mechanism returns to its normally circuit open position, discontinuing current flow through terminal 96, control circuit 98 and the valve opening circuit of electric control valve 22.

The fourth timing switch 16 connected to terminal 100 has its signal mechanism 156 set to trigger and energize timing switch 168 at whatever pre-determined time delay needed for control circuit 98 and the valve opening circuit of electric control valve 22 to become non-conductive. At such time signal mechanism 156 of the fourth timing switch 168 is set to energize that switch thereby moving its switching mechanism to the circuit closed position, impressing a voltage of the gate 158 of SCR 160 connected to terminal 102 causing current to flow through that terminal, through control circuit 102 and to the valve closing circuit of electric control valve 22 thereby moving valve 22 to its valve closed position so no pressurized and heated water can flow from the boiler 2 into the first cooking chamber 18.

The fifth timing switch 170 connected to terminal 104 has its signal mechanism 156 set to trigger and energize timing switch 170 at whatever pre-selected time delay chosen for completion of the cooking cycle in the first cooking chamber 18 plus the time delay needed for control circuit 102 and the valve closing circuit of electric control valve 22 to move that valve to its valve closed position. The signal mechanism 156 of timing switch 170 then energizes that switch causing its switching mechanism to move to the circuit closed position, impressing a voltage on the gate 158 of SCR 160 connected to terminal 104 causing current to flow through control circuit 106 to the terminal of servo-motor 108 which causes it to rotate in the direction of rotation which moves the second ball valve 34 to its valve open position.

The contents of the first cooking chamber 18 then flows under the high pressure in that chamber through conduit 36 and ball valve 34 into the lower pressure second cooking chamber 42 as far as the spaghetti and water in its liquid state are concerned, and into the expansion tank 58 as far as the steam vapor is concerned.

The signal mechanism 156 of the fifth timing switch 170 is set to keep such switch energized and its switching mechanism in the circuit closed position for whatever pre-determined time delay needed for the second ball valve 34 to move to its valve open position, whereupon signal mechanism 156 and timing switch 170 again become non-conductive and the switching mechanism thereof returns to its normally circuit open position discontinuing current flow to terminal 104.

The sixth timing switch 172 connected to terminal 110 has its signal mechanism 156 set to trigger and energize switch 172 at whatever pre-determined time delay needed for the signal mechanism 156 of the fifth timing switch 170 to move its switch mechanism to its circuit open position and discontinue current flow through control circuit 106, plus the pre-determined time delay needed for the entire contents of the first cooking chamber 18 to pass therefrom, through conduit 36 and ball valve 34 into the second cooking chamber 42 and expansion tank 58.

After such pre-determined time delay, the signal mechanism 156 of the sixth timing switch 172 move its switching mechanism to th circuit closed position thereby impressing a voltage on the gate 158 of SCR 160 connected to terminal 110. Current thus flows through such SCR to terminal 110, through control circuit 112 connected to the terminal of servo-motor 108 which causes it to rotate in the opposite direction of rotation which moves the second ball valve 34 to its valve closed position.

The signal mechanism 156 of the sixth timing switch 172 is set to keep the switching mechanism thereof in the circuit closed and conductive position for whatever pre-determined time needed to move the second ball valve 34 to its completely closed position, whereupon signal mechanism 156 and the sixth timing switch 172 become non-conductive and its switching mechanism returns to its normally circuit open position, discontinuing current flow through control circuit 112 and the servo-motor 108.

The seventh timing switch 17 connected to terminal 114 has its signal mechanism 156 set to trigger and energize switch 174 after whatever pre-determined time delay needed for the signal mechanism 156 of the sixth timing switch 172 to move its switching mechanism to the circuit open position rendering control circuit 11 non-conductive by which time the second ball valve 3 is in its valve closed position.

After such pre-determined time delay plus whatever pre-selected time delay chosen for the spaghetti to cook in the second cooking chamber 42, such as twenty seconds, the signal mechanism 156 of the seventh timing switch 174 is set to become energized and moves the switching mechanism of switch 174 to the circuit closed position to impress a voltage on the gate 158 of the SCR 160 which is connected to terminal 114. Current thus flows to terminal 114, through control circuit 116 to energize the valve opening circuit of the electrically powered drain valve 60 causing it to move to its valve open position. The water in the second cooking chamber 42 can thus drain out, leaving the fully cooked spaghetti therein.

The signal mechanism 156 of the seventh timing switch 174 is set to keep such switch energized for whatever pre-determined time delay needed for the electrically powered drain valve 60 to be moved to its valve open position. After such time delay, the signal mechanism 156 and switch 174 become non-conductive and current ceases to flow through control circuit 116.

The eighth timing switch 176 has its signal mechanism 156 set to energize switch 176 after control circuit 116 becomes non-conductive and after whatever pre-determined time delay needed for all of the water to drain out from the second cooking chamber 42. It then reaches the point to energize the timing switch 176 causing its switching mechanism to move to the circuit closed position, impressing a voltage on the gate 158 of the SCR 160 connected to terminal 118, rendering such SCR conductive so current flows through terminal 118, control circuit 120 to energize the valve closing circuit of the electrically powered drain valve 60 causing it to move to its valve closed position.

The signal mechanism 156 of the eighth timing switch 176 is set to hold switch 17 conductive for whatever pre-selected time delay needed for the drain valve 60 to be moved to its valve closed position, after which time the signal mechanism has moved to the position which renders switch 17 non-conductive. Its switching mechanism then returns to its normally circuit open position making terminal 118 and control circuit 120 again non-conductive.

A ninth timing switch 178 is connected to terminal 122 which in turn is connected by control circuit 124 to the terminal of servo-motor 12 which rotates such motor when energized in the direction to move the discharge door or hinged bottom wall 70 of the second cooking chamber 42 to its door open position for discharge of the fully cooked spaghetti on to a serving plate 72. The signal mechanism 156 of the timing switch 178 is set to trigger and energize that switch after whatever pre-determined time delay needed for the water to drain out from the second cooking chamber 42 after the electrically powered drain valve 60 has been opened as a result of timing switch 174 energizing the valve opening circuit thereof. The signal mechanism 156 energizes switch 178 at such pre-determined set time, which impresses a voltage on the gate 158 of SCR 160 connected to terminal 122 causing the SCR to become conductive. Current then flows through the SCR 160 to terminal 122, through control circuit 124 and to the terminal of servo-motor 126 which rotates it in the direction to open the discharge door 70 of the second cooking chamber 42.

Such signal mechanism 156 of the timing switch 178 is set to hold such switch conductive for whatever pre-determined time delay needed to move the discharge door 70 to its door open position, after which such signal mechanism 156 and timing switch 178 become non-conductive enabling its switching mechanism to return to its normally circuit open position.

A tenth timing switch 180 is connected to terminal 128 which in turn is connected by control circuit 130 to the terminal of servo-motor 126 which rotates such motor when energized in the opposite direction to move the discharge door 70 of the second cooking chamber 42 back to its door closed position. The signal mechanism 156 of timing switch 180 is set to trigger and energize that switch after the ninth timing switch 178 and control circuit 124 have been rendered non-conductive plus th additional pre-determined time delay needed for the spaghetti to be discharged from the second cooking chamber 42. The signal mechanism 156 is set to hold the timing switch 180 conductive for the length of time needed for the servo-motor 126 to move the discharge door 70 to its fully closed position. Thereafter the timing switch 180 becomes non-conductive, its switch mechanism returns to its normally contact open position and with no voltage impressed on the gate 158 of SCR 160, such SCR returns to its blocking state to interrupt current flow to the terminal 128 and control circuit 130.

An eleventh timing switch 182 is provided to trigger an SCR 160 into conduction to energize terminal 132 and control circuit 134 connected to the terminal of a fourth servo-motor 136 which rotates it in the direction to pivot the spout 76 of sauce dispenser 74 into registration with the spaghetti which has been deposited on the serving plate 72. The signal mechanism 156 of timing switch 182 is set to energize that switch after the time delay necessary for current flow to the terminal 128 and control circuit 130 to be interrupted which means that the discharge door 70 has been lifted upwardly to its door closed position and out of the way for the spout 70 to rotate into position over the spaghetti on the serving plate 72.

When energized, timing switch 182 impresses a voltage on the gate 158 of SCR 160 connected to terminal 132, which makes such SCR conductive whereby current flows to that terminal of servo-motor 136 which rotates such motor in the direction that pivots the spout 70 to its in-registration position over the spaghetti in serving plate 72. The signal mechanism 156 of timing switch is set to keep such switch conductive for whatever pre-determined time needed for servo-motor 136 to pivot the spout 70 to its in-registration position, whereupon the signal mechanism 156 renders the switch 182 non-conductive returning the SCR to its current blocking state and interrupting current flow to the servo-motor 136.

A twelfth timing switch 184 is connected to terminal 142 which in turn is connected to the servo-motor 136 by control circuit 144, and to the terminal thereof which when energized drives such servo-motor in the opposite direction of rotation to pivot the spout 70 from the in-registration to the out-of-registration position relative to the spaghetti on the serving plate 72.

The signal mechanism 156 of the timing switch 184 is set to energize such switch to in turn operate the servo-motor and pivot the spout 70 to the out-of-registration position after whatever pre-determined time delay needed for control circuit 140 to be energized to operate the motor of sauce dispensing pump 78 and dispense a pre-determined amount of sauce on the spaghetti in the serving plate 72.

The signal mechanism 156 of the timing switch 184 is set to return the switch 184 to its non-conductive state after the pre-determined time needed for the servo-motor 136 to pivot the spout 70 from its in-registration to its out-of-registration position The SCR 160 connected to terminal 142 at such time returns to its current blocking state to interrupt the control circuit 144 and discontinue operation of the servo-motor 136.

A thirteenth timing switch 186 is connected to the gate 158 of an SCR 160 in control circuit 140 connected to drive the motor of the dispensing pump 78 when SCR 160 is switched to its conductive state. The signal mechanism 156 of timing switch 186 is set to energize such switch after whatever pre-determined time delay needed for control circuit 134 to be energized and drive servo-motor 136 in the direction to pivot the spout 70 to its in-registration position above the spaghetti in the serving plate 72, and for such control circuit 134 to thereafter return a non-conductive state.

After such time delay, the signal mechanism 156 of timing switch 186 has reached the timed point at which it energizes the switch which in turn impresses a voltage on the gate 158 of the SCR which is connected to the terminal 138 thereby switching the SCR to its conductive state allowing current to flow through control circuit 140 and drive the motor of the sauce dispensing pump 78. The signal mechanism 156 of this timing switch 186 is set to interrupt energization of such switch after whatever pre-determined time delay has been chosen for the pump 78 to dispense a selected quantity of sauce on to the spaghetti in the serving plate 72.

The control circuit 82 includes a step down transformer 188 to provide a stepped down voltage for the control circuit and sequential controller 84, and a full wave bridge 190 of conventional design to provide rectified current thereto.

Pasta for use in the fast cook machine described herein above comprises individual tubular lengths 200 of pasta, whose primary ingredients are finely ground wheat grain and water, baked and hardened into substantially rigid elongated and cylindrical pieces. The pasta material 202 of finely ground wheat grain and water is first formed into a paste and applied around an elongated steel rod or die 204 to build up a cylindrical body of paste material 202 having an outer diameter of about three-sixteenths of an inch. The die 204 preferably has an outer diameter of about three-thirty seconds of an inch. The die with paste material therearound is baked to harden, then cooled and the die withdrawn, leaving a cylindrical bore 206 extending longitudinally through the individual tubular lengths 200 having a diameter of about three-thirty seconds of an inch. The outer diameters of the paste material 202, the outer diameter of the die 204, and the diameter of the cylindrical bore 206 may vary slightly from these dimensions and such pasta may also be successfully cooked in the fast cook machine as described.

The highly pressurized high temperature water in the cooking chamber 18 is able to enter the central bore 206 and force its way under such high pressure through the pores of the pasta material which open to the central bore 206 to enter into the interior of the pasta material from the inner wall 208. At the same time, the highly pressurized high temperature water in the cooking chamber 18 forces its way under such high pressure through the pores of the pasta material which open to the outer cylindrical wall 210 of the tubular pasta lengths 200 to enter into the interior of the pasta material from the outer wall 210. The entire interior portions of the pasta material are thus penetrated very rapidly by the high temperature water under such very high pressure as described above, thereby making it possible to completely cook the tubular pasta lengths 200 in the very short time span of about sixty seconds.

The annular wall 212 of pasta material surrounding the longitudinal cylindrical bore 206 preferably has a thickness of between one-sixteenth of an inch to one-thirty second of an inch.

A convenient length of the individual tubular lengths of pasta 200 is between eight to ten inches.

I claim:

1. A fast cook machine to fast cook pasta in combination with pasta to be cooked in such machine, comprising a cooking assembly, said cooking assembly including boiler means to provide a supply of pressurized hot water at a pre-selected temperature above the boiling point of water when at atmospheric pressure and under a pre-selected elevated pressure which substantially prevents said high temperature water from vaporizing, a cooking chamber separate from said boiler means, pressurized water conduit means to flow said pressurized hot water from said boiler means to said cooking chamber, a pressurized water control valve in said pressurized water conduit means operable between a valve open and a valve closed position, an entrance passageway of said cooking chamber for entrance of said pasta into said cooking chamber, an entrance control valve in said entrance passageway operable between a valve open and a valve closed position, and outlet means to discharge said pasta and said pressurized hot water from said cooking chamber after cooking said pasta therein for a pre-selected time, said pasta comprising a tubular length of pre-baked finely ground-edible grain material pre-mixed with water to form an elongated shaft of pasta ready for cooking in said fast cook machine, said elongated shaft of pasta having a first end and an opposite second end, and a longitudinal bore extending through said elongated shaft of pasta opening to both said first and second ends thereof to receive pressurized hot water within said longitudinal bore while said pasta is in said cooking chamber and said pressurized hot water is flowed therein for cooking said pasta.

2. A fast cook machine to fast cook pasta in combination with pasta to be cooked in such machine as set forth in claim 1, wherein said edible grain material of which said pasta is comprised includes grains of wheat.

3. A fast cook machine to fast cook pasta in combination with pasta to be cooked in such machine as set forth in claim 1, wherein said elongated shaft of pasta includes a cylindrical outer wall, said longitudinal bore therethrough also being cylindrical in cross-sectional configuration.

4. A fast cook machine to fast cook pasta in combination with pasta to be cooked in such machine a set forth in claim 1, wherein said elongated shaft of pasta is substantially rigid.

5. A fast cook machine to fast cook pasta in combination with pasta to be cooked in such machine as set forth in claim 3, wherein said cylindrical outer wall of said elongated shaft of pasta has a diameter of no greater than substantially three-sixteenth of an inch.

6. A fast cook machine to fast cook pasta in combination with pasta to be cooked in such machine as set forth in claim 3, wherein said longitudinal bore through said elongated shaft of pasta has a diameter no greater than substantially three-thirty seconds of an inch.

7. A fast cook machine to fast cook pasta in combination with pasta to be cooked in such machine as set forth in claim 1, wherein said elongated shaft of pasta has a cross-sectional dimension no greater than substantially three-sixteenth of an inch, said longitudinal bore therethrough has a cross-sectional dimension no greater than substantially three-thirty seconds of an inch.

8. A fast cook machine to fast cook pasta in combination with pasta to be cooked in such machine as set forth in claim wherein said elongated shaft of pasta comprises an annular wall of said pre-baked finely ground edible grain material pre-mixed with water surrounding said longitudinal bore, the thickness of said annular wall being about one-thirty second of an inch.

9. A fast cook machine to fast cook pasta in combination with pasta to be cooked in such machine as set forth in claim 1, wherein said elongated shaft of pasta comprises an annular wall of said pre-baked finely ground edible grain material pre-mixed with water surrounding said longitudinal bore, the thickness of said annular wall being about one-sixteenth of an inch.

10. A fast cook machine to fast cook pasta in combination with pasta to be cooked in such machine as set forth in claim 1, wherein said elongated shaft of pasta has a longitudinal dimension of about eight inches.

11. A fast cook machine to fast cook pasta in combination with pasta to be cooked in such machine as set forth in claim 1, wherein said elongated shaft of pasta has any longitudinal dimension chosen between eight inches and ten inches.

12. A fast cook machine to fast cook pasta in combination with pasta to be cooked in such machine as set forth in claim 1, wherein said elongated shaft of pasta has a longitudinal dimension of no less than eight inches and no more than ten inches.

13. A fast cook machine to fast cook pasta in combination with pasta to be cooked in such machine, comprising a cooking assembly, said cooking assembly including boiler means to provide a supply of pressurized hot water at a pre-selected temperature above the boiling point of water when at atmospheric pressure and an elevated pressure which substantially prevents said high temperature water from vaporizing, a cooking chamber separate from said boiler means, conduit means to flow said pressurized hot water from said boiler means to said cooking chamber, temperature monitor means connected thereto to determine and indicate the temperature of said pressurized hot water throughout the time it is in said cooking chamber, temperature maintenance means operatively associated with said cooking chamber to increase the temperature of said pressurized hot water when necessary to maintain it at said pre-selected temperature throughout the time said pressurized hot water is in said cooking chamber, said cooking chamber having entrance means for entrance of food therein for cooking and discharge means for discharge of food therefrom, including water discharge means to discharge said pressurized hot water from said cooking chamber, said pasta comprising a tubular length of pre-baked finely ground edible grain material pre-mixed with water to form an elongated shaft of pasta ready for cooking in said fast cook machine, said elongated shaft of pasta having a first end and an opposite second end, and a longitudinal bore extending through said elongated shaft of pasta opening to both said first and second ends thereof to receive pressurized hot water within said longitudinal bore while said pasta is in said cooking chamber and said pressurized hot water is flowed therein for cooking said pasta.

14. A fast cook machine to fast cook pasta in combination with pasta to be cooked in such machine as set forth in claim 13, wherein said edible grain material of which said pasta is comprised includes grains of wheat.

15. A fast cook machine to fast cook pasta in combination with pasta to be cooked in such machine as set forth in claim 13, wherein said elongated shaft of pasta includes a cylindrical outer wall, said longitudinal bore therethrough also being cylindrical in cross-sectional configuration.

16. A fast cook machine to fast cook pasta in combination with pasta to be cooked in such machine as set forth in claim 13, wherein said elongated shaft of pasta is substantially rigid.

17. A fast cook machine to fast cook pasta in combination with pasta to be cooked in such machine as set forth in claim 15, wherein said cylindrical outer wall of said elongated shaft of pasta has a diameter of no greater than substantially three-sixteenth of an inch.

18. A fast cook machine to fast cook pasta in combination with pasta to be cooked in such machine as set forth in claim 15, wherein said longitudinal bore through said elongated shaft of pasta has a diameter no greater than substantially three-thirty seconds of an inch.

19. A fast cook machine to fast cook pasta in combination with pasta to be cooked in such machine a set forth in claim 13, wherein said elongated shaft of pasta has a cross-sectional dimension no greater than substantially three-sixteenth of an inch, said longitudinal bore therethrough has a cross-sectional dimension no greater than substantially three-thirty seconds of an inch.

20. A fast cook machine to fast cook pasta in combination with pasta to be cooked in such machine as set forth in claim 13, wherein said elongated shaft of pasta comprises an annular wall of said pre-baked finely ground edible grain material pre-mixed with water surrounding said longitudinal bore, the thickness of said annular wall being about one-thirty second of an inch.

21. A fast cook machine to fast cook pasta in combination with pasta to be cooked in such machine as set forth in claim 13, wherein said elongated shaft of pasta comprises an annular wall of said pre-baked finely ground edible grain material pre-mixed with water surrounding said longitudinal bore, the thickness of said annular wall being about one-sixteenth of an inch.

22. A fast cook machine to fast cook pasta in combination with pasta to be cooked in such machine as set forth in claim 13, wherein said elongated shaft of pasta has a longitudinal dimension of about eight inches.

23. A fast cook machine to fast cook pasta in combination with pasta to be cooked in such machine as set forth in claim 13, wherein said elongated shaft of pasta has any longitudinal dimension chosen between eight inches and ten inches.

24. A fast cook machine to fast cook pasta in combination with pasta to be cooked in such machine as set forth in claim 13 wherein said elongated shaft of pasta has a longitudinal dimension of no less than eight inches and no more than ten inches.

25. A fast cook machine to fast cook pasta in combination with pasta to be cooked in such machine, comprising a cooking assembly, said cooking assembly comprising boiler means to provide a supply of pressurized hot water at a pre-selected temperature above the boiling point of water when at atmospheric pressure and under a pre-selected elevated pressure which substantially prevents said high temperature water from vaporizing a cooking chamber separate from said boiler means, conduit means to flow said pressurized hot water from said boiler means to said cooking chamber, pressure monitor means connected thereto to determine and indicate the pressure therein throughout the time said pressurized hot water is in said cooking chamber, pressure maintenance means operatively associated with said cooking chamber to increase the pressure therein when necessary to maintain it at said pre-selected elevated pressure throughout the time said pressurized hot water is in said cooking chamber, said cooking chamber having entrance means for entrance of food therein for cooking and discharge means for discharge of food therefrom, including water discharge means to discharge said pressurized hot water from said cooking chamber, said pasta comprising a tubular length of pre-baked finely ground edible grain material pre-mixed with water to form an elongated shaft of pasta ready for cooking in said fast cook machine, said elongated shaft of pasta having a first end and an opposite second end, and a longitudinal bore extending through said elongated shaft of pasta opening to both said first and second ends thereof to receive pressurized hot water within said longitudinal bore while said pasta is in said cooking chamber and said pressurized hot water is flowed therein for cooking said pasta.

26. A fast cook machine to fast cook pasta in combination with pasta to be cooked in such machine as set forth in claim 25, wherein said edible grain material of which said pasta is comprised includes grains of wheat.

27. A fast cook machine to fast cook pasta in combination with pasta to be cooked in such machine as set forth in claim 25, wherein said elongated shaft of pasta includes a cylindrical outer wall, said longitudinal bore therethrough also being cylindrical in cross-sectional configuration.

28. A fast cook machine to fast cook pasta in combination with pasta to be cooked in such machine as set forth in claim 25, wherein said elongated shaft of pasta is substantially rigid.

29. A fast cook machine to fast cook pasta in combination with pasta to be cooked in such machine as set forth in claim 27, wherein said cylindrical outer wall of said elongated shaft of pasta has a diameter of no greater than substantially three-sixteenth of an inch.

30. A fast cook machine to fast cook pasta in combination with pasta to be cooked in such machine a set forth in claim 27, wherein said longitudinal bore through said elongated shaft of pasta has a diameter no greater than substantially three-thirty seconds of an inch.

31. A fast cook machine to fast cook pasta in combination with pasta to be cooked in such machine as set forth in claim 25, wherein said elongated shaft of pasta has a cross-sectional dimension no greater than substantially three-sixteenth of an inch, said longitudinal bore therethrough has a cross-sectional dimension no greater than substantially three-thirty seconds of an inch.

32. A fast cook machine to fast cook pasta in combination with pasta to be cooked in such machine as set forth in claim 25, wherein said elongated shaft of pasta comprises an annular wall of said pre-baked finely ground edible grain material pre-mixed with water surrounding said longitudinal bore, the thickness of said annular wall being about one-thirty second of an inch.

33. A fast cook machine to fast cook pasta in combination with pasta to be cooked in such machine as set forth in claim 25, wherein said elongated shaft of pasta comprises an annular wall of said pre-baked finely ground edible grain material pre-mixed with water surrounding said longitudinal bore, the thickness of said annular wall being about one-sixteenth of an inch.

34. A fast cook machine to fast cook pasta in combination with pasta to be cooked in such machine as set forth in claim 25, wherein said elongated shaft of pasta has a longitudinal dimension of about eight inches.

35. A fast cook machine to fast cook pasta in combination with pasta to be cooked in such machine as set forth in claim 25, wherein said elongated shaft of pasta has any longitudinal dimension chosen between eight inches and ten inches.

36. A fast cook machine to fast cook pasta in combination with pasta to be cooked in such machine as set forth in claim 25, wherein said elongated shaft of pasta has a longitudinal dimension of no less than eight inches and no more than ten inches.

37. A fast cook machine to fast cook pasta in combination with pasta to be cooked in such machine, comprising a cooking assembly, said cooking assembly comprising a chamber to receive said pasta for cooking therein, pressurized cooking means to provide high temperature water at a temperature above that of the boiling point of water when at atmospheric pressure and under an elevated pressure which substantially prevents said high temperature water from vaporizing, said cooking chamber and said pressurized cooking means being located remote from each other, and connecting means to operatively connect said pressurized cooking means to said cooking chamber for delivering thereto said high temperature water under an elevated pressure which substantially prevents said high temperature water from vaporizing, food inlet means to permit entry of said pasta into said cooking chamber for cooking and food outlet means to discharge said pasta from said cooking chamber after completion of cooking therein, said pasta comprising a tubular length of pre-baked finely ground edible grain material pre-mixed with water to form an elongated shaft of pasta ready for cooking in said fast cook machine, said elongated shaft of pasta having a first end and an opposite second end, and a longitudinal bore extending through said elongated shaft of pasta opening to at least a one of said first and second ends thereof to receive said high temperature water within said longitudinal bore at a said temperature above that of the boiling point of water when at atmospheric pressure and under an elevated pressure which substantially prevents high temperature water within said longitudinal bore from vaporizing.

38. A fast cook machine to fast cook pasta in combination with pasta to be cooked in such machine as set forth in claim 37, wherein said edible grain material of which said pasta is comprised includes grains of wheat.

39. A fast cook machine to fast cook pasta in combination with pasta to be cooked in such machine as set forth in claim 37, wherein said elongated shaft of pasta includes a cylindrical outer wall, said longitudinal bore therein also being cylindrical in cross-sectional configuration.

40. A fast cook machine to fast cook pasta in combination with pasta to be cooked in such machine as set forth in claim 37, wherein said elongated shaft of pasta is substantially rigid.

41. A fast cook machine to fast cook pasta in combination with pasta to be cooked in such machine as set forth in claim 39, wherein said cylindrical outer wall of said elongated shaft of pasta has a diameter of no greater than substantially three-sixteenth of an inch.

42. A fast cook pasta machine to fast cook pasta in combination with pasta to be cooked in such machine as set forth in claim 39, wherein said longitudinal bore in said elongated shaft of pasta has a diameter no greater than substantially three-thirty seconds of an inch.

43. A fast cook pasta machine to fast cook pasta in combination with pasta to be cooked in such machine as set forth in claim 37, wherein said elongated shaft of pasta has a cross-sectional dimension no greater than substantially three-sixteenth of an inch, said longitudinal bore therein has a cross-sectional dimension no greater than substantially three-thirty seconds of a inch.

44. A fast cook machine to fast cook pasta in combination with pasta to be cooked in such machine as set forth in claim 37, wherein said elongated shaft of pasta comprises an annular wall of said pre-baked finely ground edible grain material pre-mixed with water surrounding said longitudinal bore, the thickness of said annular wall being about one-thirty second of an inch.

45. A fast cook machine to fast cook pasta in combination with pasta to be cooked in such machine as set forth in claim 37, wherein said elongated shaft of pasta comprises an annular wall of said pre-baked finely ground edible grain material pre-mixed with water surrounding said longitudinal bore, the thickness of said annular wall being about one-sixteenth of an inch.

46. A fast cook machine to fast cook pasta in combination with pasta to be cooked in such machine as set forth in claim 37, wherein said elongated shaft of pasta has a longitudinal dimension of about eight inches.

47. A fast cook machine to fast cook pasta in combination with pasta to be cooked in such machine as set forth in claim 37, wherein said elongated shaft of pasta has any longitudinal dimension chosen between eight inches and ten inches.

48. A fast cook machine to fast cook past in combination with pasta to be cooked in such machine as set forth in claim 37, wherein said elongated shaft of pasta has a longitudinal dimension of no less than eight inches and n more than ten inches.

* * * * *

UNITED STATES PATENT AND TRADEMARK OFFICE
CERTIFICATE OF CORRECTION

PATENT NO. : 5,215,001
DATED : June 1, 1993
INVENTOR(S) : Henry R. Narcisi

It is certified that error appears in the above-indentified patent and that said Letters Patent is hereby corrected as shown below:

Column 3, line 38, after "boiler" insert - -2- -

Column 3, line 55, after "conduit" delete "2"
 and insert - -20- -

Column 4, line 49, after "chamber" delete "1"
 and insert - -18- -

Column 6, line 2, after "chamber" delete "4"
 and insert - -42- -

Column 6, line 10, after "controller" delete "8"
 and insert - -84- -

Column 6, line 52, delete "on"
 and insert - -one- -

Column 6, line 55, after "chamber" delete "1"
 and insert - -18- -

Column 7, line 34, after "plate" delete "7"
 and insert - -72- -

Column 8, line 28, after "switch" delete "8"
 and insert - -83- -

Column 8, line 54, after "mechanism" delete "15"
 and insert - -156- -

UNITED STATES PATENT AND TRADEMARK OFFICE
CERTIFICATE OF CORRECTION

PATENT NO. : 5,215,001
DATED : June 1, 1993
INVENTOR(S) : Henry R. Narcisi

It is certified that error appears in the above-indentified patent and that said Letters Patent is hereby corrected as shown below:

Column 9, line 33, after "switch" delete "16"
and insert - -168- -

Column 10, line 24, delete "move"
and insert - -moves- -;

Column 10, line 25, delete "th"
and insert - -the- -.

Column 10, line 43, after "switch" delete "17"
and insert - -174- -

Column 10, line 48, after "circuit" second
occurrence delete "11" and insert - -112- -;

Column 10, line 49, after "valve" delete "3"
and insert - -34- -

Column 11, line 18, after "switch" delete "17"
and insert - -176- -

Column 11, line 22, after "switch" delete "17"
and insert - -176- -

Column 11, line 28, after "servo-motor"
delete "12" and insert - -126- -

Column 11, line 64, after "plus" delete "th"
and insert - -the- -

UNITED STATES PATENT AND TRADEMARK OFFICE
CERTIFICATE OF CORRECTION

PATENT NO. : 5,215,001
DATED : June 1, 1993
INVENTOR(S) : Henry R. Narcisi

It is certified that error appears in the above-indentified patent and that said Letters Patent is hereby corrected as shown below:

<u>In The Claims</u>:

Column 14, Claim 8, line 59, after "claim"
        insert - -1,- -

Column 20, Claim 48, line 8, after "cook" delete
        "past" and insert - -pasta- -

Column 20, Claim 48, line 12, delete "n"
        and insert - -no- -.

Signed and Sealed this

Eighteenth Day of January, 1994

*Attest:*

BRUCE LEHMAN

*Attesting Officer*      *Commissioner of Patents and Trademarks*